United States Patent
Kircher et al.

(10) Patent No.: US 9,701,423 B2
(45) Date of Patent: Jul. 11, 2017

(54) AIRCRAFT CABIN ARRANGEMENT FOR COMPLEX LIGHTING SCENARIOS

(71) Applicant: Airbus Operations GmbH, Hamburg (DE)

(72) Inventors: Benedikt Kircher, Hamburg (DE); Paul Edwards, Hamburg (DE); Hans-Tillmann Karrenbrock, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 14/619,705

(22) Filed: Feb. 11, 2015

(65) Prior Publication Data
US 2015/0232199 A1    Aug. 20, 2015

(30) Foreign Application Priority Data

Feb. 14, 2014    (DE) .................... 10 2014 202 753

(51) Int. Cl.
*B64D 47/02*    (2006.01)
*B64C 1/06*    (2006.01)
(Continued)

(52) U.S. Cl.
CPC .............. *B64D 47/02* (2013.01); *B60Q 3/43* (2017.02); *B60Q 3/745* (2017.02); *B64C 1/066* (2013.01);
(Continued)

(58) Field of Classification Search
CPC ............ B64D 2011/0038; B64D 47/02; B64D 2203/00; B60Q 3/0283; B60Q 2500/10;
(Continued)

(56) References Cited

U.S. PATENT DOCUMENTS

| 2,229,145 A | 1/1941 | Stewart |
| 2,582,738 A | 1/1952 | Arenberg |

(Continued)

FOREIGN PATENT DOCUMENTS

| DE | 3713466 A1 | 11/1988 |
| DE | 19825269 C2 | 4/2001 |

(Continued)

OTHER PUBLICATIONS

Search Report for German Application No. DE 10 2014 202 783.7 dated Nov. 6, 2014.

(Continued)

*Primary Examiner* — Hargobind S Sawhney
(74) *Attorney, Agent, or Firm* — Jenkins, Wilson, Taylor & Hunt, P.A.

(57) ABSTRACT

An aircraft cabin arrangement for a passenger aircraft, extending along a cabin axis which runs centrally through the aircraft cabin arrangement, having a ceiling trim arrangement provided in the upwardly pointing part of the outer wall of the aircraft cabin arrangement and is arranged above the cabin axis, wherein the ceiling trim arrangement comprises a central ceiling panel element and lateral ceiling panel elements which have a panel element, wherein the central ceiling panel element is arranged vertically above the cabin axis, wherein the lateral ceiling panel elements adjoin the central ceiling panel element on both sides in the lateral direction perpendicularly with respect to the cabin axis, wherein one or more of the central ceiling panel element and the lateral ceiling panel elements has a flat lighting device which is embodied in a flat fashion such that it extends over a surface section of the ceiling panel element.

13 Claims, 2 Drawing Sheets

(51) Int. Cl.
  *B64D 11/00* (2006.01)
  *F21V 21/02* (2006.01)
  *B60Q 3/43* (2017.01)
  *B60Q 3/74* (2017.01)
  *F21W 101/06* (2006.01)
  *F21Y 115/10* (2016.01)

(52) U.S. Cl.
  CPC .............. *B64D 11/00* (2013.01); *F21V 21/02* (2013.01); *B60Q 2500/10* (2013.01); *B64D 2011/0038* (2013.01); *F21W 2101/06* (2013.01); *F21Y 2115/10* (2016.08)

(58) Field of Classification Search
  CPC .... B60Q 3/004; B60Q 3/0213; B60Q 3/0259; B60Q 3/00; F21V 5/04; F21V 13/14; F21V 21/005; F21V 33/0052; F21V 33/006; F21V 5/00; F21V 5/02; F21V 7/0016; F21V 7/0091; F21V 7/041; F21V 3/049; F21V 21/02; F21S 8/02; F21S 48/2243; F21S 48/2268; F21S 8/026; F21S 8/04; F21W 2101/06; F21W 2121/008; G02B 6/0021; G02B 6/0051; G02B 6/0095; F21Y 2101/00; F21Y 2103/10; F21Y 2105/00; G02F 1/133604
  See application file for complete search history.

(56) References Cited

U.S. PATENT DOCUMENTS

| | | | |
|---|---|---|---|
| 2,587,807 | A | 3/1952 | Arenberg |
| 3,210,875 | A | 10/1965 | Schwenkler |
| 3,211,904 | A | 10/1965 | Schwenkler |
| 3,358,134 | A | 12/1967 | Gonyea |
| 4,081,665 | A | 3/1978 | Corbeil |
| 5,113,322 | A | 5/1992 | Mikalonis |
| 5,129,597 | A * | 7/1992 | Manthey ............... B60Q 3/025 244/118.5 |
| 5,558,425 | A | 9/1996 | Pons |
| 6,158,690 | A | 12/2000 | Wadey et al. |
| 6,547,184 | B2 * | 4/2003 | Nieberle ............... B64C 1/1484 244/118.5 |
| 7,703,956 | B2 * | 4/2010 | Wentland ............... B60Q 3/025 362/470 |
| 7,896,530 | B2 | 3/2011 | Budinger |
| 8,814,093 | B2 | 8/2014 | Wuggetzer et al. |
| 2002/0041144 | A1 | 4/2002 | Fujishiro |
| 2005/0135093 | A1 * | 6/2005 | Alexanderson ........ B60Q 3/025 362/227 |
| 2005/0211841 | A1 | 9/2005 | Guard |
| 2006/0237585 | A1 | 10/2006 | Lau et al. |
| 2007/0102577 | A1 | 5/2007 | Saint-Jalmes |
| 2008/0219013 | A1 | 9/2008 | Budinger |
| 2008/0266886 | A1 * | 10/2008 | Wentland ............... B60Q 3/025 362/470 |
| 2010/0014009 | A1 | 1/2010 | Stavaeus et al. |
| 2010/0157615 | A1 | 6/2010 | Gruhlke |
| 2012/0156420 | A1 | 6/2012 | Greiner |
| 2012/0224382 | A1 | 9/2012 | Petersohn et al. |
| 2015/0151850 | A1 * | 6/2015 | Eakins ................... B64D 47/02 362/471 |
| 2015/0232166 | A1 | 8/2015 | Kircher et al. |
| 2015/0232167 | A1 | 8/2015 | Kircher et al. |

FOREIGN PATENT DOCUMENTS

| | | |
|---|---|---|
| DE | 10149194 A1 | 6/2002 |
| DE | 10231324 A1 | 1/2004 |
| DE | 10 2004/051146 A1 | 5/2006 |
| DE | 20 2007/006707 U1 | 7/2007 |
| DE | 10 2006/007285 A1 | 8/2007 |
| DE | 10 2007/020397 A1 | 10/2008 |
| DE | 10 2009/041597 A1 | 3/2011 |
| DE | 10 2011/013206 A1 | 9/2012 |
| EP | 1288123 B1 | 3/2005 |

OTHER PUBLICATIONS

Search Report for German Application No. DE 10 2014 202 753.5 dated Nov. 5, 2014.
Non-Final Office Action for U.S. Appl. No. 14/619,690 dated Oct. 17, 2016.
Non-Final Office Action for U.S. Appl. No. 14/619,509 dated Jun. 28, 2016.

* cited by examiner

AIRCRAFT CABIN ARRANGEMENT FOR COMPLEX LIGHTING SCENARIOS

CROSS-REFERENCE TO RELATED APPLICATION

This application claims priority to German Patent Application No. 10 2014 202 753.5 filed Feb. 14, 2014, the entire disclosure of which is incorporated by reference herein.

TECHNICAL FIELD

The subject matter disclosed herein relates to an aircraft cabin arrangement for a passenger aircraft, which aircraft cabin arrangement extends linearly along a cabin axis which runs centrally through the aircraft cabin arrangement.

BACKGROUND

Such aircraft cabin arrangements for passenger aircraft which extend along a cabin axis running centrally through the cabin are sufficiently known, wherein such a cabin arrangement generally comprises a multiplicity of passenger seats which are arranged in rows running perpendicularly with respect to the cabin axis. Furthermore, these cabin arrangements have paneling arrangements which form the lateral and upper outer wall of the cabin, wherein these paneling arrangements separate off the interior of the aircraft cabin arrangement from the outer skin of the aircraft fuselage. In this context, an intermediate space, in which inter alia systems such as supply devices, lines, insulating elements and load-bearing elements of the aircraft fuselage are arranged, is bounded between the paneling arrangement and the actual outer skin.

In order to make the dimensions of the interior of the aircraft cabin arrangement as large as possible, it is desirable to position the paneling element as close as possible to the outer skin of the fuselage, but this is limited by the requirements which arise owing to the systems provided in the intermediate space between the paneling arrangement and the outer skin.

Furthermore, lighting arrangements also have to be mounted, in particular, in the region of the ceiling trim arrangement which is provided in the upwardly pointing part of the outer wall of the aircraft cabin. However, in order to avoid decreasing the dimensions of the interior of the cabin and, in particular, the height thereof, the lighting arrangements in the ceiling trim arrangement should not take up a large amount of space above the ceiling trim arrangement. An additional problem occurs here in the central region of the aircraft cabin arrangement, that is to say vertically above the cabin axis which runs centrally through the cabin arrangement. In this region, the Passenger Supply Channel (PSC) is mounted in the intermediate space between the ceiling trim arrangement and the outer skin of the aircraft fuselage, and brings about particular restrictions there in terms of the space available for lighting elements.

However, it is desirable that the lighting arrangements in the ceiling region are configured in such a way that they permit attractive complex lighting scenarios for the passengers. This applies, in particular, to the region above aisles which extend from doors transversely with respect to the cabin axis.

SUMMARY

Taking the prior art as a starting point, an object of the subject matter disclosed herein is therefore to make available an aircraft cabin arrangement which is configured in such a way that it permits complex lighting scenarios to be produced even in the central region.

According to the subject matter disclosed herein, this object is achieved by an aircraft cabin arrangement having a ceiling trim arrangement which is provided in the upwardly pointing part of the outer wall of the aircraft cabin arrangement and is arranged above the cabin axis. This ceiling trim arrangement comprises a central ceiling panel element and lateral ceiling panel elements which each have a panel element which extends in a flat fashion and forms the main body of the ceiling panel elements. The central ceiling panel element is arranged vertically above the cabin axis, i.e. perpendicularly above the cabin axis. The lateral ceiling panel elements adjoin the central ceiling panel element directly on both sides perpendicularly with respect to the cabin axis in the lateral direction, wherein no further elements are located between the central ceiling panel element and the lateral ceiling panel elements arranged adjacent thereto on both sides.

Finally, a flat lighting device is provided in at least one of the ceiling panel elements, which lighting device is embodied in a flat fashion such that it extends over a surface section of the ceiling panel element. This means that not only does the lighting arrangement comprise individual lighting sources, arranged for example in a linear manner, but also the lighting sources of the lighting device are arranged distributed over a two-dimensional region. The lighting sources are therefore arranged in such a way that they are distributed over a surface region, wherein a multiplicity of lighting sources, preferably more than five, are provided in this surface region. It is also conceivable that an individual lighting source which is embodied in a flat fashion, such as for example a planar organic light emitting diode (OLED), extends over the surface section.

As a result of the flat lighting device which is arranged in the region vertically above the central cabin axis, it is possible to produce complex lighting scenarios even in the central region of the aircraft cabin through suitable activation of the individual lighting sources or of a flat lighting element. This is significant, in particular, when the ceiling panel elements are located with the flat lighting device in the region adjacent to monuments in the center of the cabin, i.e. in the region of galley units or cupboards between which an aisle running transversely with respect to the cabin axis is provided. An attractive scenario for passengers entering the cabin can then be brought about there using the flat lighting device.

In the arrangement according to the subject matter disclosed herein, the flat lighting device is provided in a region in which comparatively little space is available owing to the passenger supply channel present there, which otherwise would actually mitigate against such an arrangement. However, the advantage of the relatively high level of flexibility when selecting the lighting scenarios outweighs this space problem.

The lateral ceiling panel elements are preferably provided adjacent to the central ceiling panel element with in each case a flat lighting device, with the result that the lighting can be suitably adapted, in particular in the region of transverse aisles. However, it is also conceivable that in addition or alternatively the central ceiling panel element has a flat lighting device.

In a first preferred embodiment, the flat lighting device can have a single passage opening or a multiplicity of passage openings in the panel element, wherein a monitor such as, for example, an LCD or LED monitor, is arranged on the side facing away from the interior of the aircraft cabin. This monitor can then be used to generate the desired lighting scenario, wherein the selection of the number and size of passage openings determines the extent to which the monitor can be seen from the interior of the cabin and which regions then generate light which can actually be seen in the cabin, respectively.

Alternatively it is also possible that the panel element has a translucent, that is to say light-permeable section, wherein a multiplicity of lighting sources are then arranged distributed over the translucent section on the side of the panel element pointing away from the interior of the cabin. The translucent section then constitutes the surface section of the panel element in which the flat lighting device is formed. In this context, there is, in particular, the advantage that if the lighting sources are switched off, they can hardly be perceived by passengers. This aesthetically desirable effect is reinforced if the translucent region is surface coated in a suitable way, with the result that when the lighting sources are switched off the translucent region is virtually indistinguishable from the rest of the panel element. This can be achieved by a suitable selection of a surface coating.

In one preferred embodiment, the translucent section is preferably coated on the side facing away from the interior of the cabin with an opaque material, wherein the region of the coating is in the plane of the panel element at a distance from the lighting sources. In this way, it is possible to form in the translucent region a pattern which can be seen by a passenger when the lighting sources are switched on.

In a further preferred embodiment, the lighting sources arranged above the translucent section can be provided with a mask element which is arranged between the lighting source and the translucent section and which impresses a contour on the light beam emitted by the lighting source, which contour can be seen when the light beam is projected onto a surface in the direction of propagation thereof. These arrangements composed of a lighting source and mask element may be, in particular, what are referred to as GOBO (Graphical Optical Black Out) arrangements by which special patterns, and also information, can be projected onto surfaces which can be seen by the passenger in the cabin. As a result of the fact that this arrangement is provided in a ceiling trim element, the probability that passengers will enter the beam path and therefore disrupt the projection is low if a monument which is provided underneath the ceiling trim arrangement is irradiated.

As an alternative to a translucent section, it is also possible if a multiplicity of lighting sources are arranged in recesses which are distributed in a flat fashion over the panel element and which can also be provided in this context with mask elements in order in turn to permit the projection of patterns onto wall surfaces or floor surfaces.

In one alternative embodiment, the panel element has a recess, and a translucent projection surface extending in the plane of the recess is provided to the recess. Furthermore, provided above the ceiling panel element is a projector on the side of the projection surface facing away from the interior of the cabin, wherein the projector then projects patterns or moving images onto the projection surface.

In this way, it is possible to use a projector in order to achieve a complex lighting scenario. In this context it is possible to arrange the projector as desired in the space above the ceiling panel element and, in particular, to adapt its position to the installation space available there.

BRIEF DESCRIPTION OF THE DRAWINGS

In the text which follows, the subject matter disclosed herein will be explained on the basis of a drawing which only shows preferred exemplary embodiments, wherein.

DETAILED DESCRIPTION

Figure 2:
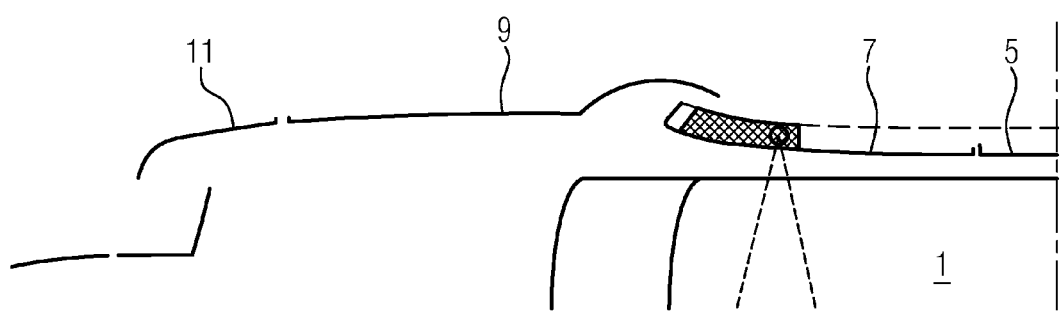
FIG. 2 shows part of the cross section from FIG. 1 in an enlarged illustration.

FIG. 2 illustrates an exemplary embodiment of an aircraft cabin arrangement according to the subject matter disclosed herein in cross section, the aircraft cabin arrangement extending linearly along a cabin axis KA, i.e. the distance between the outer wall of the cabin arrangement and the cabin axis KA is, apart from the end regions, substantially constant. The outer wall bounds the interior of the cabin with respect to the outer skin of the aircraft, wherein an intermediate space in which systems and supply devices are arranged and into which load-bearing parts of the fuselage extend is formed between the actual outer skin and the outer wall of the cabin arrangement.

Figure 1:
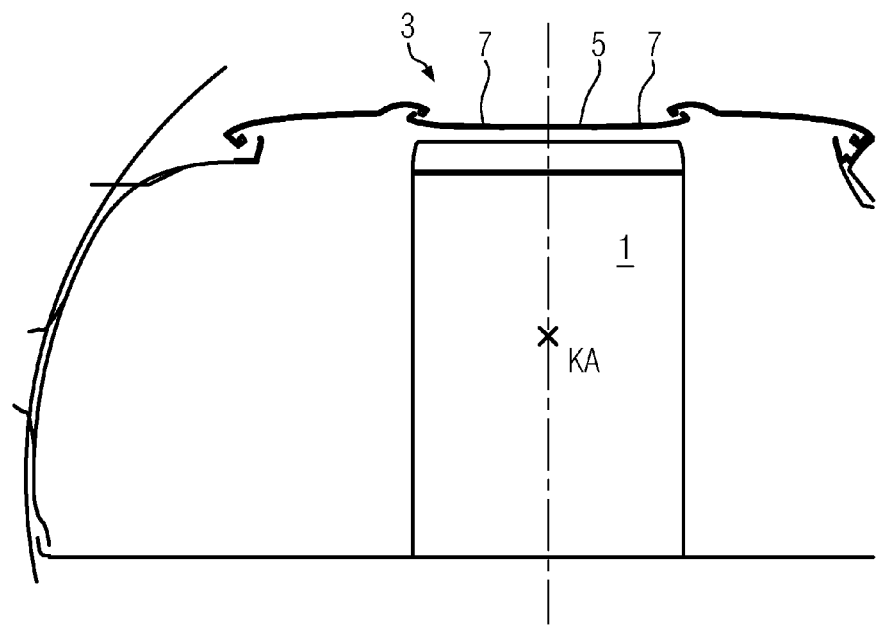
FIG. 1 shows an exemplary embodiment of an aircraft cabin arrangement according to the subject matter disclosed herein in cross section.

The aircraft cabin arrangement from FIG. 1 has, at the axial position illustrated here, a monument 1 in the center in the region of the cabin axis KA, which monument 1 is arranged underneath a ceiling trim arrangement 3, and which monument 1 may be, for example, a cupboard or a galley unit. The ceiling trim arrangement 3, which is shown in an enlarged illustration in FIG. 2, forms in the upward direction the outer wall of the aircraft cabin arrangement and has, vertically above the cabin axis KA, a central ceiling panel element 5 and lateral ceiling panel elements 7 which are mounted directly adjacent to the central ceiling panel element 5, on both sides in the lateral direction perpendicularly with respect to the cabin axis KA. On that side of the lateral ceiling panel elements 7 which faces away from the central ceiling panel element 5 there is in each case an adjoining central ceiling element 9 and a further lateral ceiling element 11, which, however, are not described further in detail here. Provided above the central ceiling panel element 5 is a passenger supply channel 12 which extends along the cabin arrangement parallel to the cabin axis and bounds the space available at this location for components provided on the ceiling panel elements 5, 7.

According to the subject matter disclosed herein, both the central ceiling panel element 5 and the lateral ceiling panel elements 7 can be provided with a flat lighting device which is embodied in a flat fashion such that it extends over a surface section of the respective ceiling panel element 5, 7. In particular, not only are the lighting sources used in the lighting device here arranged in a linear shape but the at least five lighting sources here are distributed over a surface section.

Figure 3:
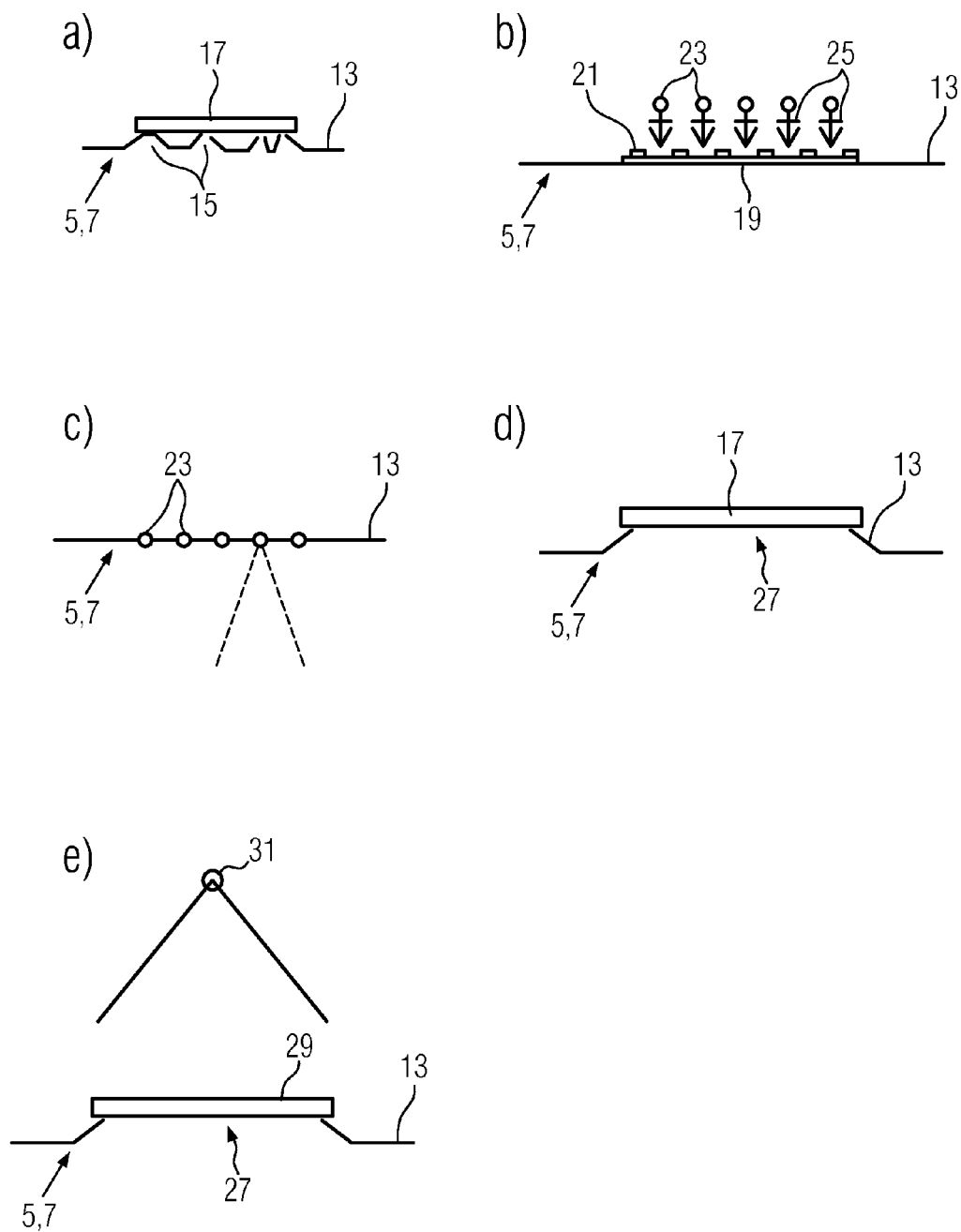
FIG. 3 shows several exemplary embodiments of the lighting device for the ceiling panel elements from FIG. 2 in cross section.

In this context, FIG. 3 shows cross sections of different embodiments of the lighting device which is arranged in the ceiling panel element 5, 7, wherein in FIG. 3 the extent in the plane perpendicular to the plane of the drawing is not illustrated.

As is shown in part a) of FIG. 3, the respective ceiling panel element 5, 7 has a panel element 13 which extends in the plane of the ceiling panel element 5, 7. The panel element 13 has, in the embodiment in part a), a multiplicity of passage openings 15, and a monitor 17 which is embodied as an LCD or LED monitor is mounted on the side of the ceiling panel element 5, 7 or of the panel element 13 facing away from the interior of the cabin, with which LCD or LED monitor it is possible to produce complex lighting scenarios which can be seen through the passage openings 15 in the interior of the cabin or which illuminate the interior of the cabin. In particular, the monitor 17 can be actuated in such a way that only those regions of the monitor 17 which are above the passage openings 15 illuminate in the desired fashion.

In part b) of FIG. 3, a further embodiment of the flat lighting device is illustrated, wherein here the panel element 13 has a translucent, that is to say light-permeable section 19, the rear side of which, which points away from the interior of the aircraft cabin, is partially provided with masking 21 composed of an opaque material in the regions over which no lighting sources are arranged. Lighting sources 23 are provided over the non-masked regions of the translucent section 19, which lighting sources 23 are provided in the preferred exemplary embodiment illustrated here with mask elements 25, with the result that a contour is impressed on the light beam emitted by the lighting source, which contour can be seen when the light beam strikes a surface running transversely with respect to the direction of propagation thereof. In particular, the arrangements of the lighting sources 23 and mask elements 25 can be embodied as GOBOs, that is to say as graphical optical black out arrangements.

In the embodiment of the lighting device which is illustrated in part c) of FIG. 3, the panel element 13 has a multiplicity of recesses which are distributed over a surface section of the panel element 13 and in which lighting sources 23 are arranged, wherein these can in turn also be embodied as what are referred to as GOBOs, i.e. they are embodied with a mask element for impressing a contour on the light beam.

However, it is also possible that flat organic light emitting diodes (OLEDs) which can be mounted easily and in a space-saving fashion or integrated into the panel element 13 are used as lighting sources 23.

In the exemplary embodiment illustrated in part d) of FIG. 3, the panel element 13 has a flat recess 27, and an LED or LCD monitor 17 is aligned with the recess 27, which LED or LCD monitor 17 is virtually completely visible from below through the recess 27. By using this arrangement it is possible to present complex patterns which change over time on the monitor 17, which patterns are used to illuminate the region around the monument 1 and can be utilized there to produce complex, aesthetically attractive lighting effects.

Finally, part e) of FIG. 3 shows an arrangement in which a translucent projection surface 29 is arranged above a planar recess 27 in the panel element 13. Above the translucent projection surface 29 on the side of the panel element 13 facing away from the interior of the cabin a projector 31 is provided at any desired location in the intermediate space between the ceiling trim arrangement 3 and the outer skin of the aircraft fuselage, which projector 31 is aligned with the projection surface 29 and illuminates the surface. In this arrangement it is possible to arrange the projector 31 at a suitable location in the intermediate space between the outer skin and the ceiling trim arrangement 3, to be precise in particular where the space requirements permit this. In this context it is not necessary that the projector 31 is arranged perpendicularly above the projection surface 29 with the result that in fact the projector 31 can be arranged in a flexible way. In the case of a central ceiling panel element 5 which is provided with a projection surface 29 it is therefore possible to mount the projector laterally adjacent to the passenger supply channel 12. Nevertheless, with this arrangement it is possible to produce complex lighting scenarios underneath the central ceiling panel element 5.

From the above it is apparent that with the aircraft cabin arrangement according to the subject matter disclosed herein it is possible to produce complex lighting scenarios even in the central region of the cabin, and, in particular, monuments located in this region can be illuminated.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft cabin arrangement for complex lighting scenarios in a passenger aircraft, comprising
   a ceiling trim arrangement in an upwardly pointing part of an outer wall of the aircraft cabin arrangement and arranged above a cabin axis, which runs centrally through the aircraft cabin arrangement,
   wherein the aircraft cabin arrangement extends linearly along the cabin axis,
   wherein the ceiling trim arrangement comprises a central ceiling element and lateral ceiling elements which each have a panel element,
   wherein the central ceiling element is arranged vertically above the cabin axis,
   wherein the lateral ceiling elements adjoin the central ceiling element on both sides in the lateral direction perpendicularly with respect to the cabin axis,
   wherein at least one of or both of the central ceiling element and the lateral ceiling elements has a flat lighting device which is embodied in a flat fashion such that it extends over a surface section of the panel element,
   wherein the flat lighting device has a multiplicity of lighting sources which are arranged in recesses in the panel element,
   wherein the panel element has a translucent section,
   wherein a multiplicity of lighting sources are arranged distributed over the surface section on the far side of the panel element from the interior of the aircraft cabin arrangement,
   wherein the translucent section is coated with an opaque material in regions at a distance from the lighting sources.

2. The aircraft cabin arrangement according to claim 1, wherein the lateral ceiling elements have a flat lighting device.

3. The aircraft cabin arrangement according to claim 1, wherein only the central ceiling element has a flat lighting device.

4. The aircraft cabin arrangement according to claim 1, wherein the flat lighting device has one or more passage openings in the panel element, and wherein a monitor is provided on the far side of the panel element from the interior of the aircraft cabin arrangement.

5. The aircraft cabin arrangement according to claim 1, wherein a mask element is arranged between one of the lighting sources and the translucent section and causes a contour on a light beam emitted by the lighting source, which can be seen when the light beam is projected onto a surface transverse to the direction of the light beam.

6. The aircraft cabin arrangement according to claim 1, wherein a mask element is arranged in front of one of the lighting sources and causes a contour on a light beam emitted by the lighting source, which can be seen when the light beam is projected onto a surface transverse to the direction of the light beam.

7. The aircraft cabin arrangement according to claim 1, wherein the flat lighting device has flat organic light-emitting diodes.

8. The aircraft cabin arrangement according to claim 1, wherein the panel element has a recess with which a translucent projection surface is aligned, which projection surface runs parallel to or in the plane of the panel element,
    wherein a projector which is aligned with the projection surface is provided at a distance from the projection surface, on the far side of the panel element from the interior of the aircraft cabin arrangement.

9. An aircraft cabin arrangement for complex lighting scenarios in a passenger aircraft, comprising
    a ceiling trim arrangement in the upwardly pointing part of the outer wall of the aircraft cabin arrangement and is arranged above a cabin axis, which runs centrally through the aircraft cabin arrangement,
    wherein the aircraft cabin arrangement extends linearly along the cabin axis,
    wherein the ceiling trim arrangement comprises a central ceiling element and lateral ceiling elements which each have at least one panel element,
    wherein the central ceiling element is arranged vertically above the cabin axis,
    wherein the lateral ceiling elements adjoin the central ceiling element on both sides in the lateral direction perpendicularly with respect to the cabin axis,
    wherein at least one of or both of the central ceiling element and the lateral ceiling elements has a flat lighting device which is embodied in a flat fashion such that it extends over a surface section of the panel element,
    wherein the panel element has a translucent section,
    wherein a multiplicity of lighting sources are arranged distributed over the surface section on the far side of the panel element from the interior of the aircraft cabin arrangement, and
    wherein the translucent section is coated with an opaque material in regions at a distance from the lighting sources.

10. The aircraft cabin arrangement according to claim 9, wherein a mask element is arranged between one of the lighting sources and the translucent section and causes a contour on a light beam emitted by the lighting source, which can be seen when the light beam is projected onto a surface transverse to the direction of the light beam.

11. The aircraft cabin arrangement according to claim 9, wherein the flat lighting device has flat organic light-emitting diodes.

12. An aircraft cabin arrangement for complex lighting scenarios in a passenger aircraft, comprising
    a ceiling trim arrangement in the upwardly pointing part of the outer wall of the aircraft cabin arrangement and is arranged above a cabin axis, which runs centrally through the aircraft cabin arrangement,
    wherein the aircraft cabin arrangement extends linearly along the cabin axis,
    wherein the ceiling trim arrangement comprises a central ceiling element and lateral ceiling elements which each have at least one panel element,
    wherein the central ceiling element is arranged vertically above the cabin axis,
    wherein the lateral ceiling elements adjoin the central ceiling element on both sides in the lateral direction perpendicularly with respect to the cabin axis,
    wherein at least one of or both of the central ceiling element and the lateral ceiling elements has a flat lighting device which is embodied in a flat fashion such that it extends over a surface section of the panel element,
    wherein the panel element has a recess with which a translucent projection surface is aligned, which projection surface runs parallel to or in the plane of the panel element,
    wherein a projector which is aligned with the projection surface is provided at a distance from the projection surface on the far side of the panel element from the interior of the aircraft cabin arrangement.

13. The aircraft cabin arrangement according to claim 12, wherein the flat lighting device has flat organic light-emitting diodes.

\* \* \* \* \*